E. KORETZ.
DINNER BUCKET.
APPLICATION FILED OCT. 2, 1911.
1,022,246.
Patented Apr. 2, 1912.
2 SHEETS—SHEET 1.
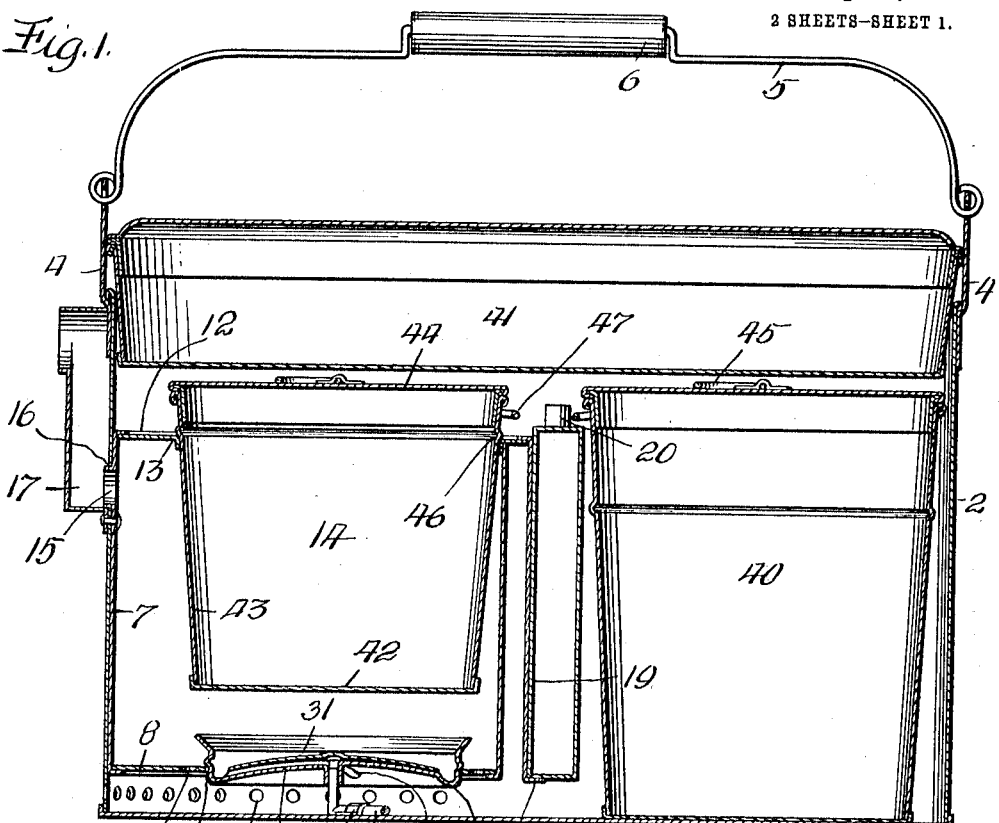
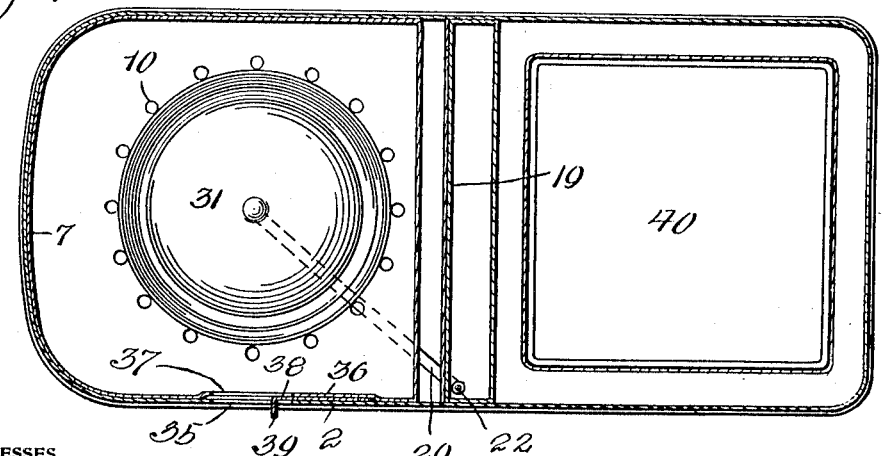
WITNESSES
INVENTOR
E. Koretz,
BY
ATTORNEYS E. KORETZ.
DINNER BUCKET.
APPLICATION FILED OCT. 2, 1911.
1,022,246.
Patented Apr. 2, 1912.
2 SHEETS—SHEET 2.
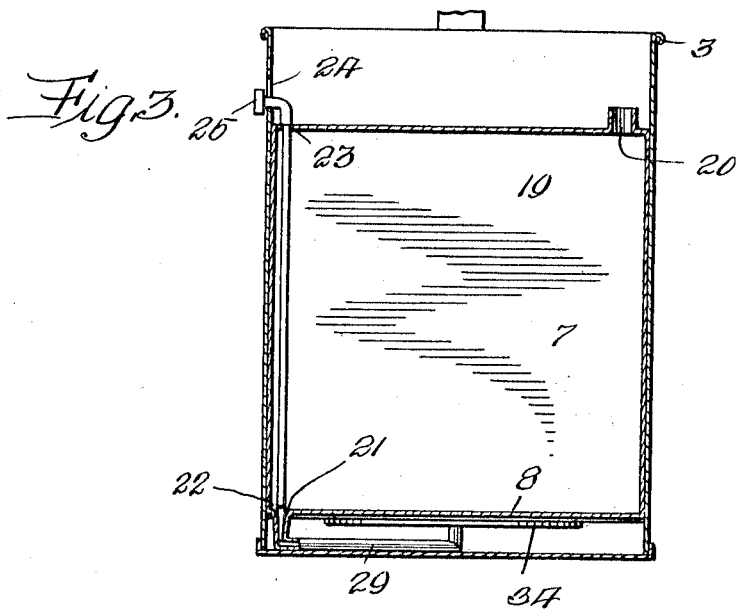
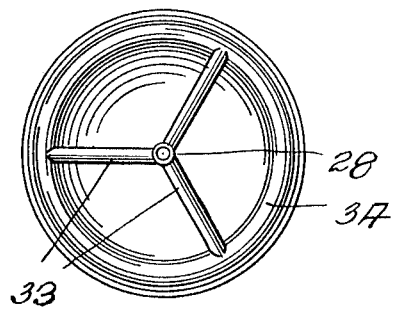
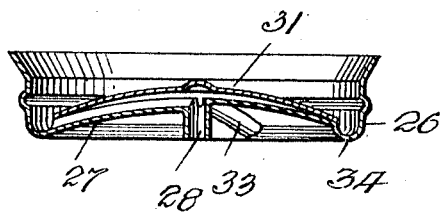
WITNESSES
INVENTOR
F. Koretz,
BY
ATTORNEYS

UNITED STATES PATENT OFFICE.

EMERICK KORETZ, OF CLEVELAND, OHIO.

DINNER-BUCKET.

1,022,246.     Specification of Letters Patent.     Patented Apr. 2, 1912.

Application filed October 2, 1911. Serial No. 652,258.

*To all whom it may concern:*

Be it known that I, EMERICK KORETZ, citizen of the United States of America, residing at Cleveland, in the county of Cuyahoga and State of Ohio, have invented certain new and useful Improvements in Dinner-Buckets, of which the following is a specification, reference being had therein to the accompanying drawing.

This invention relates to dinner buckets, and the primary object of my invention is to furnish a dinner bucket with a heating chamber, whereby liquid or other matter contained in one of the detachable receptacles of the bucket can be heated and placed in a palatable condition before being consumed.

Another object of this invention is to provide a dinner bucket with a novel burner and reservoir that occupy a comparatively small space within the bucket.

A further object of this invention is to provide a bucket with receptacles, all of which will be more or less heated during the heating of the principal receptacle.

With the above and other objects in view the invention resides in a novel construction, combination and arrangement of parts to be hereinafter specifically described and then claimed.

Reference will now be had to the drawings wherein like numerals denote corresponding parts throughout the several views in which:—

Figure 1 is a longitudinal sectional view of a bucket in accordance with this invention. Fig. 2 is a horizontal sectional view of the same. Fig. 3 is a cross sectional view of the bucket showing the reservoir. Fig. 4 is a bottom plan of a detached burner, and Fig. 5 is a cross sectional view of the same.

A bucket in accordance with this invention comprises a casing having a heating chamber, a detachable receptacle located in the heating chamber, other receptacles arranged within said casing with one of said receptacles serving functionally as the closure of the bucket, a burner extending into said heating chamber, and a reservoir for supplying fuel to said burner.

The bucket casing comprises a bottom plate 1 and to the edges of said bottom plate there are secured the lower edges of an oblong shell 2. The upper edges of the shell are reamed, as at 3 and the sides thereof provided with apertured ears 4. Loosely connected to these apertured ears are the ends of a bail 5 having a handle 6.

The heating chamber comprises a shell 7 occupying one end of the bucket. The shell 7 terminates at a point above the bottom plate 1 and the bottom of said shell is formed by a detachable bottom plate 8 having a central opening 9. The bottom plate 8 has circumferentially arranged openings 10 for ventilating purposes, these openings in conjunction with openings 11 in the shell 2 insuring perfect combustion within the heating chamber. The top of the shell 7 has a large opening 12 and suitably connected to the upper edges of the shell 7 is a supporting plate 13 for a detachable receptacle 14. The shell 7 has an outlet nipple 15 extending through an opening 16 formed in the shell 2 and said nipple is in communication with a vertical flue 17 carried by the outer side of the shell 2. The flue 17 coöperates with the openings 10 and 11 in thoroughly ventilating the heating chamber of the bucket.

The top of the shell 7 supports a depending transverse bracket 18 and mounted upon said bracket is a reservoir 19 extending the entire width of the shell 2. The top of the reservoir 19 has a filling opening 20 and the bottom of said reservoir has a tapering discharge spout 21. Extending into the spout 21 is a needle valve 22 for controlling the discharge of fuel from the reservoir 19. The needle valve 22 extends through an opening 23 in the top of the reservoir and is bent to extend through a vertical slot 24 in the shell 2. The bent end of the valve has a button 25 that permits of the valve being easily raised or lowered.

The burner comprises a cup 26 having a convexo-concave bottom 27. The bottom 27 has a central nipple 28 connected by a pipe 29 to the discharge spout 21 of the reservoir 19. The pipe 29 is secured to the bottom plate 1 by a strap 30. The bottom 27 of the burner supports a convexo-concave deflector 31, said deflector covering radially disposed conduits 33 extending from the nipple 28 to a point in proximity to the side walls of the cup 26. The side walls 26 form an annular gutter 34 for the fuel that is distributed by the conduits 33. The cup 26 is located in the opening 9 and in order that the fuel can be ignited within the cup 26, the shell 2 has an opening 35 and the shell 7 an offset portion 36 provided with an opening 37. Slidably mounted between the offset portion 36 and the shell 2 there is a shutter 38 having a hand piece 39 that extends through the opening 35. The shutter 38 can be shifted to close the openings 35 and 37.

Other receptacles 40 and 41 are arranged within the bucket, the receptacle 41 forming a closure for the bucket. The receptacles 14, 40 and 41 consist of bottom plates 42, shells 43 and lids 44. The lids 44 of the receptacles 14, and 40 have movable handles 45. The shell 43 of the receptacle 41 supports said receptacle in the upper end of the bucket. The shell 43 of the receptacle 14 has a bead 46 supporting said receptacle in the plate 13. The receptacle 40 rests upon the bottom plate 1 and this receptacle together with the receptacle 14 is provided with bails 47, whereby said receptacles can be easily removed from the bucket.

When it is desired to heat the contents of the bucket, particularly the receptacle 14, the needle valve 22 is elevated to allow the fuel within the reservoir to flow by gravity to the burner beneath the receptacle 14. As soon as the fuel enters the burner, it can be ignited and burned to heat the receptacle 14 and the contents thereof.

A slow burning liquid fuel can be used, whereby after a certain quantity of fuel has been admitted to the burner, it will burn for a sufficient period of time to heat the contents of the receptacle 14.

The bucket in its entirety is made of light and durable metal, and can be made of various sizes.

What I claim is:—

A dinner bucket comprising an oblong casing, a shell arranged at one end and above the bottom thereof and constituting a heating chamber, a transversely extending narrow receptacle within said casing at one side of said shell and constituting a fuel reservoir, a bracket carried by said shell and engaging said receptacle for supporting it above the bottom of said casing, a burner carried by said shell at the lower end thereof, means arranged upon the bottom of said casing for supplying fuel from said reservoir to said burner, vertically disposed means extending through said receptacle and operated exteriorly of said casing for regulating the supply of fuel from said reservoir to said burner, means for suspending a receptacle in said shell over said burner, said casing and said shell provided with air inlet openings, a nipple carried by one end of said casing and communicating with the interior of said shell, and a vertical flue arranged against the outer face at one end of said casing and communicating with said nipple.

In testimony whereof I affix my signature in the presence of two witnesses.

EMERICK KORETZ.

Witnesses:
JOSEPH H. VANA,
ANNA L. VANA.

Copies of this patent may be obtained for five cents each, by addressing the "Commissioner of Patents, Washington, D. C."